United States Patent [19]

Eichenbaum et al.

[11] 4,147,407
[45] Apr. 3, 1979

[54] COATINGS FOR FIBER WAVEGUIDES

[75] Inventors: Bernard R. Eichenbaum, Lilburn; William B. Gardner, Atlanta, both of Ga.

[73] Assignee: Bell Telephone Laboratories, Incorporated, Murray Hill, N.J.

[21] Appl. No.: 868,043

[22] Filed: Jan. 9, 1978

Related U.S. Application Data

[63] Continuation of Ser. No. 639,912, Dec. 11, 1975, abandoned.

[51] Int. Cl.$^2$ ................................................ G02B 5/14
[52] U.S. Cl. ................................ 350/96.34; 350/96.29
[58] Field of Search ............. 350/96 B, 96 WG, 96 M

[56] References Cited

U.S. PATENT DOCUMENTS

| | | | |
|---|---|---|---|
| 2,861,393 | 11/1958 | Whitehurst et al. | 49/17 |
| 3,312,579 | 4/1967 | Heifetz | 156/305 |
| 3,711,262 | 1/1973 | Keck | 350/96 B |
| 3,810,784 | 5/1974 | Wong et al. | 350/96 B |
| 3,865,466 | 2/1975 | Slaughter | 350/96 B |
| 3,871,935 | 3/1975 | Gloge et al. | 350/96 B |
| 3,917,383 | 11/1975 | Cook et al. | 350/96 C |
| 3,980,390 | 9/1976 | Yamamoto et al. | 350/96 WG |

FOREIGN PATENT DOCUMENTS

2233637  1/1975  France .................................... 350/96

OTHER PUBLICATIONS

Gloge, D., "Optical-Fiber Packaging and its Influence on Fiber Straightness and Loss", BSTJ, vol. 54, No. 2, Feb. 1975, pp. 245-262.

Gardner, W. B., "Microbending Loss in Optical Fibers", BSTJ, vol. 54, No. 2, Feb. 1975, pp. 457-465.

*Primary Examiner*—John K. Corbin
*Assistant Examiner*—Rolf Hille
*Attorney, Agent, or Firm*—Peter V. D. Wilde

[57] ABSTRACT

Microbending loss is reduced and abrasion protection is afforded for optical fibers by relatively thick polymer coatings characterized in part by a preferred elastic tensile modulus and cold flow property. The coating process uses rapid cooling of a liquid application to promote rapid gelation or solidification and thus achieve uniform coating diameter without beading. Fibers so coated are formed into ribbon structures having definite center-to-center fiber spacing. Preparation of coated fibers or ribbon structures for splicing is achieved by solvent stripping of the coating.

3 Claims, 16 Drawing Figures

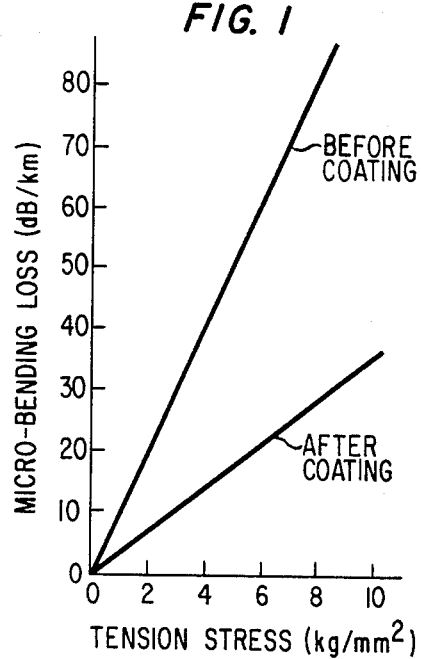
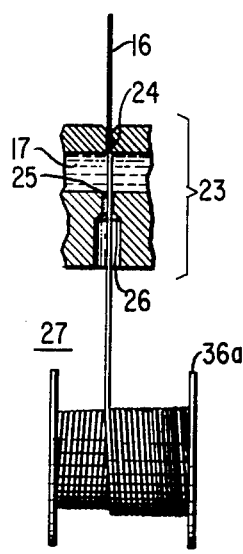
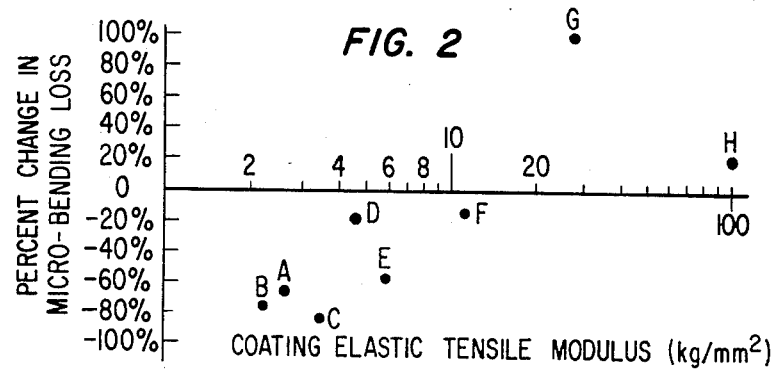
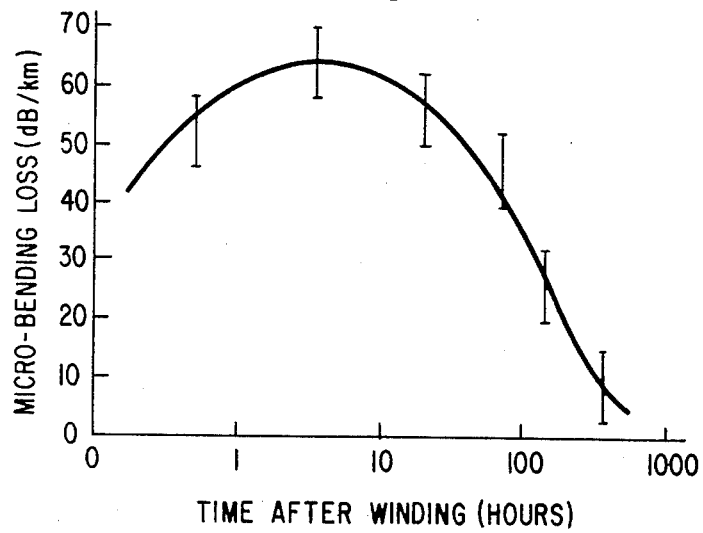

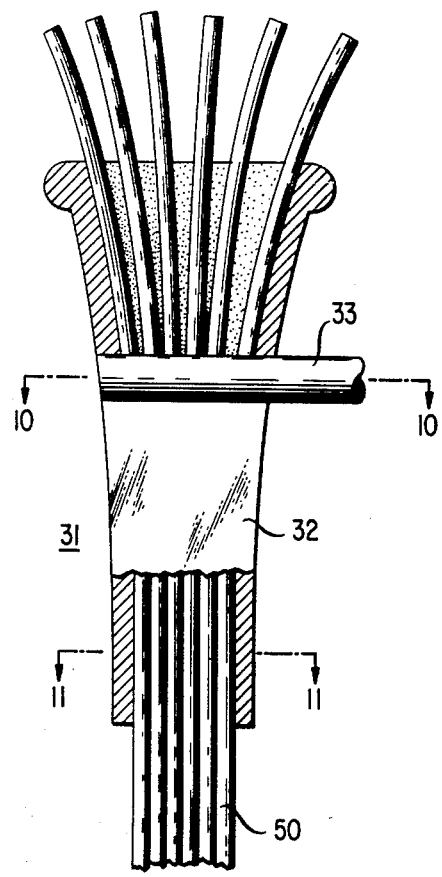
FIG. 9
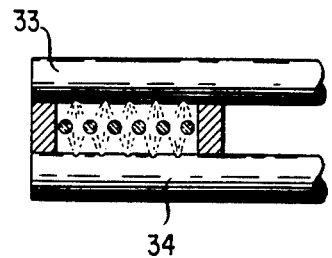
FIG. 10
FIG. 11
FIG. 13
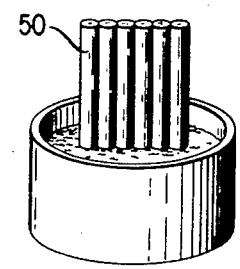
FIG. 12
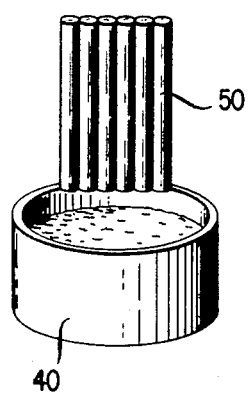
FIG. 14
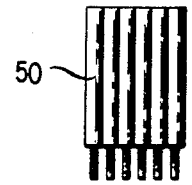

COATINGS FOR FIBER WAVEGUIDES

This is a continuation of application Ser. No. 639,912, filed Sept. 11, 1975, now abandoned.

FIELD OF THE INVENTION

This invention relates to optical fiber transmission media and to safeguarding their transmitting efficiency by protective coatings formed around one or more fibers. More specifically, the invention relates to the character of such coatings, their manner of application, and the creation of multifiber structures thereby which can be readily prepared for splicing.

BACKGROUND OF THE INVENTION

Optical fibers intended for transmission of optical signals are extremely susceptible to microbending loss. This type loss traces to small scale axial undulations of the fiber which cause coupling of the light into lossy modes. Coatings applied over the bare glass fiber are one means of cushioning the fiber from physical sources which impart the axial undulations to the fiber. One such coating system is described in the application of D. Gloge, Ser. No. 439,029, filed July 30, 1974 now U.S. Pat. No. 4,000,936, and assigned to applicants' assignee. The coating can serve also to protect the fiber from abrasion, and to hold in place protective materials that might be previously placed on the fiber.

The splicing of two optical fibers requires a greater sophistication than splicing of two copper conductors, in that the optical fibers to be joined must be abutted or closely spaced in end-to-end relation and in axial alignment. This requirement strongly favors optical fiber cables configured internally in ways that facilitate ease of splicing. To this end, a flat ribbon structure of fibers with predetermined center-to-center spacing is a desirable and often preferred arrangement, both for protecting the fibers to some extent from microbending loss and for prepositioning them preparatory to splicing. One such optical fiber ribbon structure is shown for example in the patent application Ser. No. 403,380 of C. M. Miller, now U.S. Pat. No. 3,984,172, filed Oct. 23, 1973. Ribbon structures also are a building block for a multilayer optical fiber ribbon cable. Desirably, in such a cable the fiber axes are arranged cross-sectionally in an X-Y matrix of uniform center-to-center spacing.

Microbending loss can be brought on by surprisingly slight perturbations; and consequently very close and careful control over the characteristics of a protective coating must be maintained. However, the nature of the desired control has heretofore been difficult to identify. Moreover, the need for this control over fiber coating characteristics has further complicated the creation of a workable optical fiber ribbon structure.

SUMMARY OF THE INVENTION

In one important aspect of the invention, it has been realized that, contrary to maintaining permanent concentricity between the fiber and its coating, as would be suggested by analogy to the insulated conductor art, it is actually desirable to permit a certan amount of radial movement, or "creek" between the fiber and its coating. A fiber coating which is sufficiently susceptible to cold flow to accommodate "creek", permits minute loss-causing microbends to straighten out over a period of time. The rate of "creep" which a given coating permits is usefully determined by the coating's melt index. Beneficial creep rates have been achieved with materials having melt indices up to about 500.

It has further been realized that coatings, in order to protect the fiber from microbending loss induced by diverse contacts with the environment, advantageously are characterized by an elastic tensile modulus which is not substantially in excess of about 6 kg/mm$^2$. Significantly above the range, certain coatings exhibit a tendency to actually cause increased microbending loss.

It further has been realized that cars must be taken to assure a coating that is diametrically constant. Unevenness of outer diameter renders the coating itself a source of microbending loss. Particularly to be avoided are lumps or beads that can form in all coating processes.

In a particular set of embodiments, this latter aspect of the invention contemplates a coating of optical fibers which can be applied by drawing the fibers either through a hot melt of the coating or through a solution containing the coating. Applying the coating hot and thereafter rapidly cooling the coating has been found to avoid beading. In this approach, the sudden temperature drop and corresponding viscosity increase of the coating leaves no time for beads to form.

In a highly useful extension of the invention, the protective coating may be formed around several closely spaced optical fibers drawn in tandem through a common hot coating bath. The coating may advantageously directly follow the optical fiber drawing. In one embodiment pursuant to this aspect of the invention the separate coatings placed around adjacent fibers are later bridged together in a web section as by solvent welding or alternatively, ultrasonic bonding or fusion bonding.

Thus, in one such process a multiplicity of optical fibers are created as from drawing, and immediately fed through a hot bath containing the coating in solution. The fibers pick up the coating; and then by rapid cooling, augmented to some extent by solvent release, the protective coating rapidly gels around each fiber without forming beads. After additional drying if necessary, the individual coated fibers are brought together into mutual contact in a predetermined spacing, and a measured amount of solvent is applied in the regions of contact. The composite multifiber structure is again dried. In the resulting structure, the fiber spacing and the fiber coating are well controlled.

Advantageously, the coating of a single fiber or of an optical fiber ribbon when produced pursuant to the above teaching may be removed, preparatory to splicing, by dipping the end portion of the coated element into a suitable solvent which removes the coating. The length of coating removed is determined by dipping, for a sufficient time, only the desired length of fiber or ribbon end portion in the solvent.

A specific coating material and process contemplated within the scope of the invention consists of ethylene-vinyl acetate copolymers in solution in 1,1,1-trichloroethane or toluene, wherein the copolymers have a vinyl acetate content generally ranging from about 12 weight percent to about 33 weight percent, and melt indices ranging up to about 500. Such coating materials offer especially advantageous combinations of solution properties, elastic modulus and cold flow characteristics. The coating so produced is uniform, soft, and sufficiently thick to successfully guard optical fibers against microbending losses without themselves engendering such losses.

BRIEF DESCRIPTION OF THE DRAWING

FIGS. 1, 2, 3 and 3A are graphs reporting summarized experimental results on which the invention is in part based;

FIG. 4A is a schematic diagram detailing a variation of the FIG. 4 process;

FIGS. 9, 10 and 11 are schematic sectional views of a ribbon forming stage of the FIG. 4 process; and FIGS. 12, 13, and 14 are schematic perspective diagrams showing fiber-end preparation for splicing.

DETAILED DESCRIPTION OF ILLUSTRATIVE EMBODIMENTS

Figure 3A:
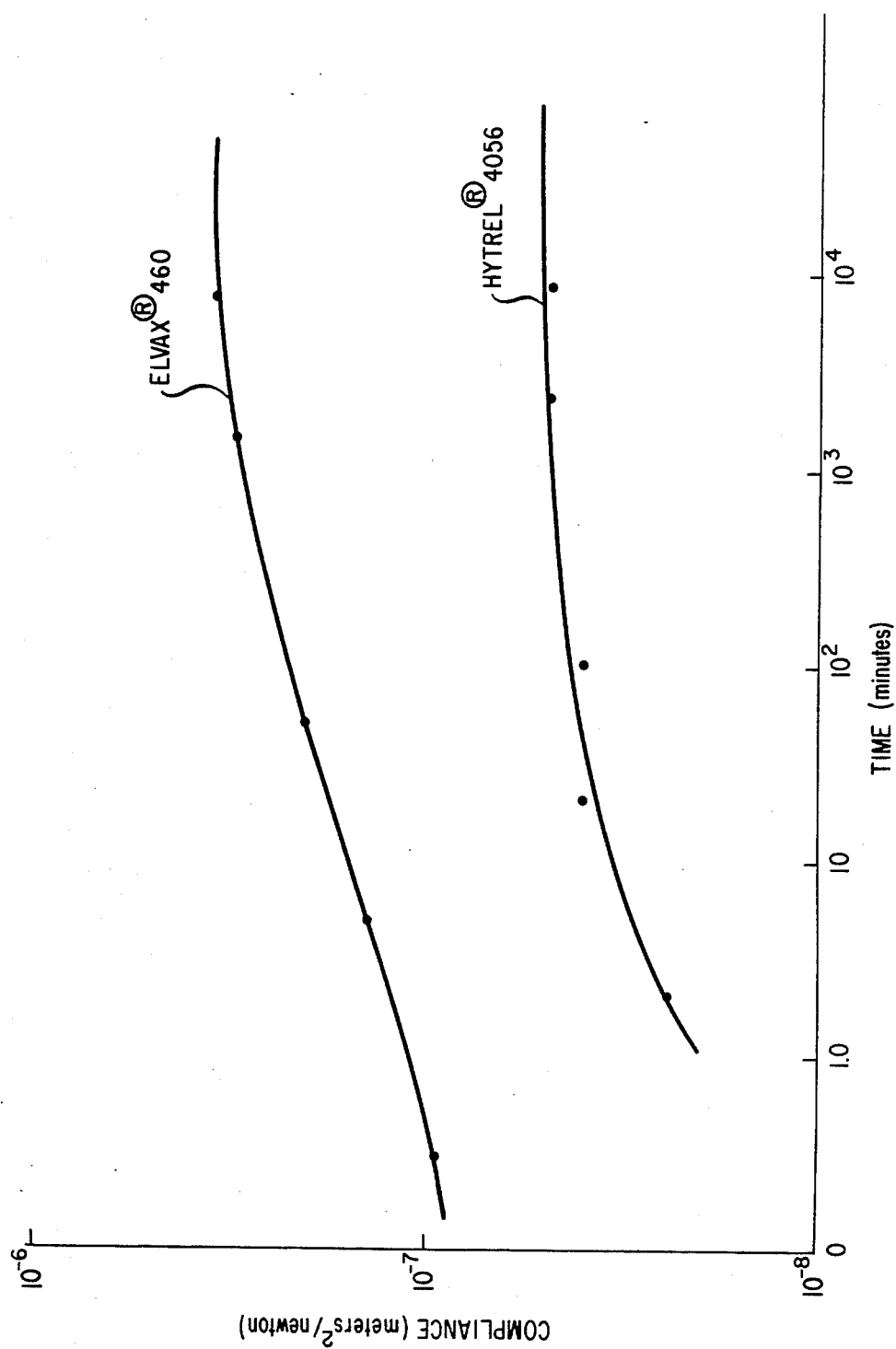

The invention will be illustrated first by describing a class of desirable optical fiber coating materials; thereafter by describing processes in which the coatings and other advantageous results are achieved; and finally by describing composite structures assembled from coated fibers and the splicing of such structures.

Coating Materials: Elastic Modulus Considerations

Through a series of experiments summarized in examples given below, it has been determined that protective coatings with a relatively low elastic tensile modulus not substantially greater than about 10 ksi, decrease the microbending loss to a particularly advantageous extent relative to the uncoated fiber.

EXAMPLE I

Several optical fibers identified with the letters A through H were prepared. Each fiber consisted of a core of germania-doped silica of about 60 microns diameter, a cladding material of silica of about 20 microns thick, and an end-to-end length of about 100 meters. Fiber A was first measured for transmission loss at 0.6328 micron wavelength while under no tension. Then fiber A was wound onto a drum about one foot in diameter to produce a first winding stress which was maintained constant. The drum surface was polished to a surface roughness of about 1 micrometer. Approximately 100 meters of the fiber was in contact with the drum surface. The tension forced the fiber to partially conform to the drum surface roughness. The transmission loss measurement was repeated. Fiber A was then removed and rewound but at a higher constant winding stress and again the transmission loss measurement was repeated. Fiber A was again unwound, and then coated with an ethylene vinyl acetate copolymer with a 25 percent vinyl acetate content, a melt index of 2, and a tensile modulus of 2.7 kg/mm², obtainable under the trandename Elvax 360 from E. I. duPont de Nemours & Co. The coating thickness was 40 micrometers following coating procedures to be described below. Fiber A, now coated, was then measured, first, for transmission loss under no tension, next under a first tension and finally under a second tension. The amount by which the loss increases over the unstressed fiber is termed the microbending loss. The foregoing data is recorded in Table I, and the results presented in FIG. 1 as the data point denoted A.

The same procedure was followed for fibers B–H, with coating materials differing in elastic modulus for each fiber, as shown in Table II.

Table I

| Fiber A | Data for Fiber A | | | |
|---|---|---|---|---|
| | Winding Stress (kg/mm²) | Measured Loss (dB/km) | Microbanding Loss (dB/km) | |
| Uncoated | 0.0 | 13.8 | 0.0 | no tension |
| | 4.1 | 52.1 | 38.3 | first tension |
| | 6.5 | 83.4 | 69.6 | second tension |
| Coated with Elvax 360 | 0.0 | 13.0 | −0.8 | no tension |
| | 4.9 | 31.0 | 17.2 | first tension |
| | 8.0 | 42.0 | 28.2 | second tension |

Table II

| Fiber | Coating | Elastic Coating Modulus (kg/mm²) | Mean Coating Thickness (μm) | Melt Index (±15%) |
|---|---|---|---|---|
| A | Elvax 360 | 2.7 | 46 | 2 |
| B | Elvax 265 | 2.1 | 50 | 3 |
| C | Elvax 410 | 3.2 | 97 | 500 |
| D | Elvax 460 | 4.5 | 35 | 3 |
| E | Hytrel 4056 | 5.9 | 40 | 7 |
| F | Versallon 1164 | 10.6 | 108 | — |
| G | Versallon 1200 | 27.4 | 80 | — |
| H | Kynar | 100 | 50 | — |

(Elvax ® compounds are copolymers of ethylene and vinyl acetate available from E. I. duPont; Hytrel ® is a polyester elastomer available from E. I. duPont; Versallon ® are polyamide compounds available from General Mills; Kynar ® is a poly(vinylidene fluoride) available from Pennsalt Co.)

It can be seen in FIG. 1 that the coating of fiber A reduced the microbending loss (in dB/kM) by about 66 percent. The change in microbending loss, brought about by each of the coatings to fiber B–H was determined as for fiber A. The results are plotted in FIG. 2.

FIG. 2 shows that typical polymer fiber coating materials of relatively low elastic modulus values of up to about 6 kg/mm² give advantageously large reductions in microbending loss. In most instances, elastic modulus values in the range of 2–5 kg/mm² are especially advantageous.

Materials which because of favorable elastic tensile modulus and thermal properties are basically suitable for relatively thick protective coating on optical fibers, include those listed below, it being recognized that possession of these requisite physical properties will depend upon proportions, average molecular weight, presence of minute quantities of cross-linking materials, and degree of cross-linking of polyfuctional material. Suitable materials include: vinylidene fluoride-hexafluoropropylene copolymer; vinylidene fluoride-trifluorochloroethylene copolymer; vinylidene fluoride-tetrafluoroethylene copolymer; amide copolymers and terpolymers; polybutadiene; polyester elastomers; styrene-butadiene copolymers; polyolefin thermoplastic rubbers; silicones; polyurethane elastomers; ethylene-ethyl acrylate copolymers; ethylenevinyl acetate copolymers; and various plasticized polymers, e.g., plasticized polyvinyl chloride.

The beneficial effects of selecting fiber coating material having elastic tensile modulus in a range not beyond about 6 kg/mm², have been found not to vary significantly for optical fibers within a range of diameters of about 80 μm to 130 μm. In general, the benefits are more fully realized when the coating thicknesses are not less than 5μm and preferably are in a range of from 20 μm to 150 μm.

In general, polymeric materials which are especially suitable as coating for optical fibers to avoid microbending losses, are importantly characterized by limited crystallinity and/or small crystallite size, so as to permit "creep" as explained below.

Advantages of permitting "creep"

As used herein, the term "creek" is the freedom of an optical fiber to relocate radially from its nominal central position within a protective coating. Technically, creep is the amount of cold plastic flow of the coating over a given time and while under a constant stress from the fiber.

Pursuant to the invention, the cold flow or creep property of a protective polymer fiber coating may be advantageously controlled to permit fiber microbends to straighten out. Accompanying the straightening is a dramatic increase in fiber transmission accounted for by the reduction in microbending loss.

For exemplary materials investigated, the creep rate has been found to depend principally on the coating material's melt index, which is herein defined as in ASTM D1238. In general, the higher the melt index, the greater is the microbending loss relief. Beneficial effects were observed in materials having a melt index as low as 2. High melt indices allow rapid creep and thus rapid relief from microbending loss.

It is generally most advantageous if substantially all creep could preferably take place within a gross time period of a few weeks after a given fiber has been installed—usually in a ribbon structure that comprises part of an installed cable. Advantageously, although not necessarily, the creep can be caused to take place to some significant extent as a stage in the optical fiber cable making process.

For the several grades of ethylene vinyl acetate studied there was observed to be a monotonic relationship between the melt index and the extent of loss relief. A similar correlation will obtain for a substantial number of coating materials having different chemical compositions.

The fibers' radial relocation permitted by creep must be limited so that the fiber does not emerge from the coating and disorganize the optical fiber cable geometry. The melt index value does not play a direct role in determining the ultimate limit of creep. For materials which are not significantly cross-linked the principal material characteristic limiting total creep is crystallinity. The degree of crystallinity is an otherwise suitable fiber coating material requisite to limit the extent of creep may be radially ascertained empirically. Limited crystallinity and/or crystallite size is desirable in most cases.

Creep rate can also be determined by putting a polymer-coated optical fiber under constant stress and noting the change of shape (strain) of the coating with time. The creep rate for a given polymer and stress level is the slope of the strain vs. time curve. For polymers to be advantageous in the present invention, the curve must plateau or reach an upper limit under conditions of stress and temperature to be expected in use. The creep (or strain) divided by the stress gives the "compliance"; and the equilibrium compliance by definition is the creep limit divided by the stress. These curves for two of the coating materials illustrated herein are shown in FIG. 3A.

It is advantageous for the coating material to have an operating condition creep limit less than the thickness of the coating, so that at the highest anticipated operating temperature and stress the fiber does not migrate through the surface of the coating. Experience and calculations to date point to an equilibrium compliance value less than 0.013 in$^2$/lb (18.8 mm$^2$/newton) for multifiber optical fiber cable, based upon a maximum expected field temperature of about 70 degrees C and a maximum applied stress of about 0.148 newtons/mm$^2$.

EXAMPLE 2

An optical fiber about 100 meters long, 84 micrometers in diameter and of communications grade was coated with a 45 micrometers thick coat of Elvax 410, an ethylene-vinyl acetate copolymer having a vinyl acetate content of about 18 weight percent, an elastic tensile modulus of 3.2 kg/mm$^2$ and a melt index of 500. The coated fiber was wound on the drum described in example 1 at a constant winding stress of about 0.064 newtons/mm$^2$ approximating conditions of fiber and coating tension that an optical fiber would encounter in an actual field installation. Transmission loss measurements were taken periodically and microbending loss data was generated. The data, plotted in FIG. 3, reveals a surprising several-fold reduction in loss after about 500 hours, or 3 weeks. The fiber was removed from the drum, inspected and found to have relocated radially within its coating in an effort to conform to a straight line, thus to compensate for the microbending imposed by the drum surface.

Ethylene Vinyl Acetate Copolymer as Coating

Because of their processing ease, their advantageously low elastic tensile modulii and their favorable melt indices in the range of from about 2 to about 500, certain ethylene vinyl acetate copolymers are particularly desirable coating materials for protecting optical fibers. The vinyl acetate content of these polymers must be chosen with due regard to a balancing of low elastic modulus against other practical considerations. Specifically, the advantages of increasing vinyl acetate content are: lower elastic modulus (which as noted improves microbending protection) and better solubility (advantageous in stripping off the coat preparatory in splicing). But as vinyl acetate content increases, tackiness increases which creates problems in re-reeling; heat resistance decreases, and gelation temperature goes down.

Of these the most critical consideration is gelation temperature because, as it goes down a rapid gelation rate is more difficult to achieve. Desirably rapid gelation rates may be attained with a vinyl acetate content upper limit of about 28 wt percent such as exhibited by Elvax 265 of Table II. Taking into account the further desirability of reducing coating tackiness, a more preferable upper limit is about 25 wt percent vinyl acetate content such as exhibited by Elvax 360 of Table II.

A lower limit of vinyl acetate content of substantially 10 wt percent is dictated principally by the corresponding upper boundary range of elastic tensile modulus. A vinyl acetate content of about 18 wt percent is substantially optimum, as the following example evidences.

EXAMPLE 3

Elvax 410, a DuPont ethylene vinyl acetate having a melt index of 500 an elastic tensile modulus of 3.2 kg/mm² and a vinyl acetate content of 18 percent was applied in the following fashion to a fiber using a coating die substantially similar to that of FIG. 5. No solvent was used. The coating device was heated to 155 degrees C. 100 percent-solids pellets of Elvax 410 were added to the reservoir and formed a pool of hot material. At line speeds up to 10 cm/sec, a coating was formed. The coated fiber was tested and showed satisfactory performance with respect to both microbending protection and abrasion protection. An examination of the coating revealed a markedly uniform diameter and the absence of any beading.

Avoiding Beading

The avoidance of beading, particularly at useful line speeds and while forming relatively thick coatings, is both essential and yet not readily achieved by techniques which rely primarily on solvent releases to solidify the liquid coating. On the other hand, rapid gelation or solidification is surprisingly reliable in the quality and uniformity of result. Using Elvax 360 and rapid gelation, line speeds of 110 cm/sec were achieved while still realizing a uniform coating.

In applying a protective coating to optical fibers, a commonly encountered problem is the tendency of the coating to bead. One possible approach to reducing beading is by solvent coating using fast drying solvents, together with a relatively high initial solution viscosity. Relying on solvent release to eliminate beading altogether, however, limits the coating thickness to the order of 20 percent of the fiber radius or less, i.e., 10 micrometers. Additionally, this process in which the primary drying relies on rapid solvent release, is particularly sensitive to initial solution viscosity, a factor which severely limits line speed. Coating agents which are heated to a temperature moderately above room ambient, for example, 40-70 degrees C prior to contacting the fiber and then rapidly cooled, do not form beads. The temperature gradient of the cooling zone causes the coating viscosity to rise so fast that insufficient time is available for beads to form.

In one procedure found advantageous, the coating agent is dissolved in a solvent. The rapid gelation occasioned by solution temperature drop is particularly useful for achieving relatively thick coatings of the order of 25 microns or more. For these thicknesses, the solvent release mechanism alone is generally too slow to prevent beading under practical conditions. The term gelation as used herein means the changing of the coating from a flowing liquid into an elastic solid or gel.

In another advantageous procedure the coating agent is a hot melt of the coating polymer. Here, the cooling causes rapid solidification of the hot melt.

EXAMPLE 4

The experiment of example 3 was repeated with Elvax 460 (ethylene vinyl acetate copolymer, 18 percent vinyl acetate content, melt index of 3), using a substantially constant line speed of 10 cm/sec. A coating of about 100 micrometers initial thickness was formed on the fiber over a fiber length of about 100 meters. Both during the coating and thereafter, the fiber was observed for evidence of bead formation. No beads were found. Separate tests indicated that the coating gelled in less than one second at room temperature and in still air without forced circulation or cooling. The coated fiber was tested with procedures stated in examples 1 and 2, and showed a high degree of protection against microbending loss.

For systems using solvents, care must be taken in selecting the solvent when primary reliance for bead avoidance is placed on rapid cooling. Different solvents used with the same coating material result in different gelation rates, different gelation temperatures, and different gel properties. The behavior of the solution film on the freshly coated fiber is also affected by the choice of solvent. A high vapor pressure solvent quickly chills the coating by evaporative cooling and thus vapor pressure indirectly affects gelation rate during coating. The high vapor pressure has the added benefit of promoting a more rapid drying of the coating.

Examples of solvents useful for solution application of ethylene vinyl acetate copolymers include: halogenated methanes, halogenated ethanes, halogenated ethylenes, halogenated propanes, halogenated propylenes; and simple aromatics such as, benzene, toluene, zylene, and trimethylbenzene.

Illustrative Process

Figure 4:
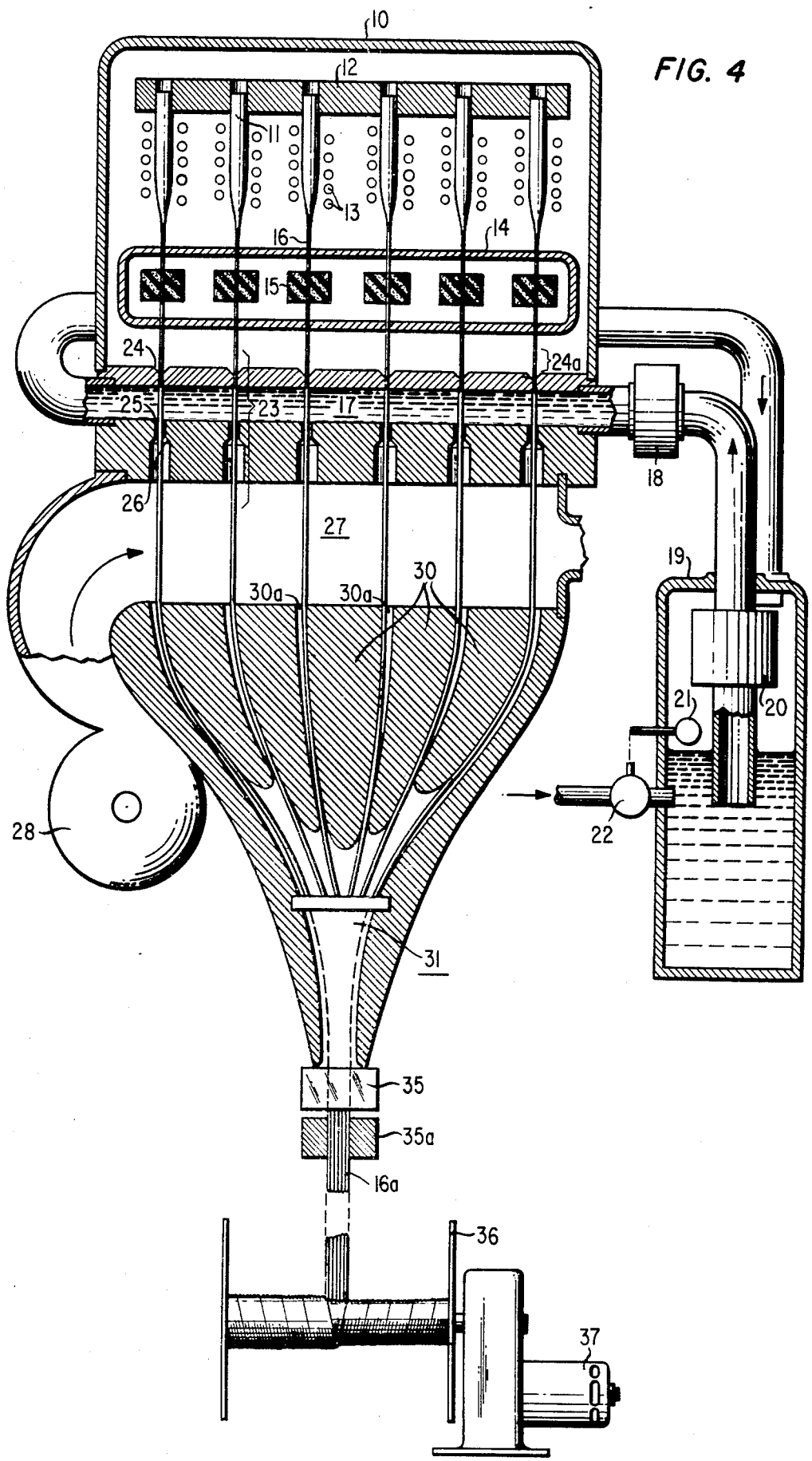
FIG. 4 is a schematic diagram of an overall fiber making process which includes coating.

FIG. 4 illustrates schematically an exemplary inline process in which individual fibers are drawn from preforms and then coated and cooled. Thereafter, if desired, the coated fibers are brought together to form a ribbon.

An enclosure denoted 10 protectively houses a series of glass preforms 11 from which fibers are drawn. Each preform 11 is clamped in a vertical position by a clamp 12, and heated to the drawing temperature by means such as electric coils 13.

Prior to fiber coating, it may be desirable as explained in patent application of Eichenbaum-Tariyal-Sabia, Ser. No. 690,091, filed May 26, 1976, U.S. Pat. No. T958010 to place a thin initial coat over the drawn water vapor reaction sites. The initial coating is achieved advantageously as soon as possible after drawing; and in the instant case is achieved within hydrophobic coating chamber 14 by wicks 15 through which the fibers 16 are drawn.

Each fiber 16 is next passed through a chamber 17 in which the coating material is present. Advantageously, the coating material circulates through chamber 17 from a tank 19 having a circulating pump 20, a level control sensor 21 and an input value 22 which operates in response to a signal from sensor 21 to replenish coating material from a source, not shown. The material may be pre-heated in heater 18. The coating dies denoted 23 in FIG. 4 are structured as illustrated in detail in FIG. 5. The fiber 16 is first fed through a centering hole 24 that has a widely flared entrance 25 designed for ease of threading. From the centering hole, the fiber 16 passes through the chamber 17 and then through a die hole 25 which flares outwardly in the region 26 at its exit end.

To avoi . any abrasion, it is desirable that the fiber not actually touch the sides of either centering hole 24 or die hole 25. To this end, the holes 24 and 25 may advantageously be lubricated with the coating material itself. This is achieved for example by maintaining a sufficient hydrostatic pressure in chamber 17 so that coating will tend to occupy the holes 24. Additionally, a reservoir of coating material can be maintained in the regions 24a.

The coating solution is then drawn through both holes 24, 25 by the moving fiber.

Figure 5:
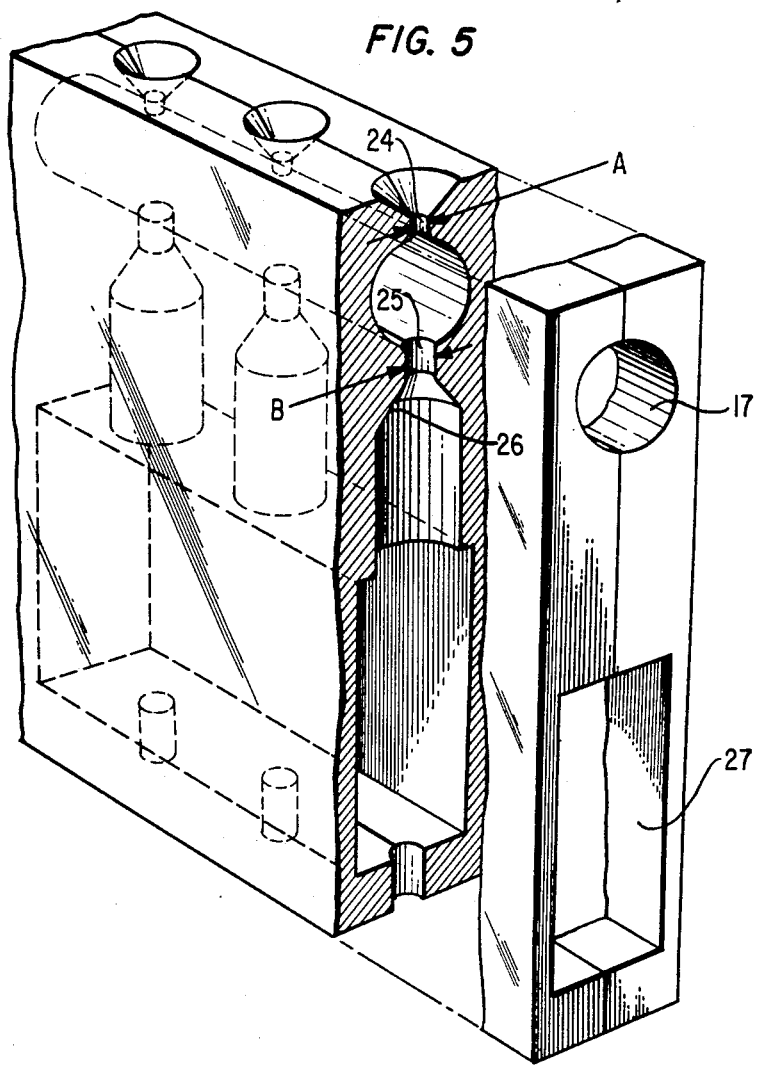
FIG. 5 is a schematic frontal perspective view of the fiber coating apparatus of FIG. 4.

The diameter of centering holes 24, denoted A in FIG. 5, is typically from 150 micrometers to 200 micrometers. The diameter of die holes 25 denoted B is from 330 to 1500 micrometers. The diameter of chamber 17 is about 3 millimeters. The diameter of fiber 16 after being drawn is about 75-150 μm. To facilitate threading, it is desirable to construct the coating dies 23 as a split die arrangement as illustrated in FIG. 5.

Advantageously, the coating solution formulation is the previously described ethylene-vinyl-acetate copolymer having a vinyl acetate content of 18 percent a melt index of 3, and an elastic modulus of 4.5 kg/mm$^2$. This solution is applied at a temperature of 55 degrees C. The coated fibers 16 on exiting from die hole 25 travel through a drying chamber 27. Here, cool dry air or a chemically inactive gas coolant is circulated as by a fan 28 to further promote rapid gelation. If the cooling gas is air at 23 degrees C., gelation will occur in about 1 second.

The flared portions 26 of die holes 25 serve to help form a meniscus of coating around the fiber 16 to promote uniform coating. Droolng of liquid coating material at the exit of the die can be minimized by providing a nonwetting die interior surface using a material such as polytetrafluorethylene.

At the exit from the cooling chamber 27, the gelling has progressed enough so that the coated fibers may be placed on a gathering reel 36a such as shown in FIG. 4a. If solvent is used, any remaining solvent is released within minutes of placing the fiber on the reel 36a. Alternatively, in the manner shown in FIG. 4, the fibers after being substantially thoroughly dried may be channeled together in corridors 30a provided by various smooth surfaced guide members 30, preparatory to forming of a fiber ribbon as by solvent welding, pursuant to a further aspect of this invention.

Figure 6:
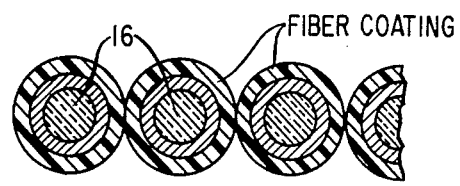
FIGS. 6, 7, and 8, are cross-sectional views of coated fibers at successive stages of being joined into a ribbon.
Figure 7:
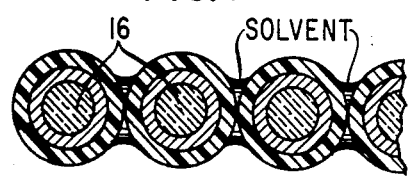

For forming of a ribbon, the coated fibers are drawn together until at station 31, shown in FIG. 9, the coated fibers are approximately tangential to each other as illustrated in FIG. 6. Station 31 consists of an open-ended rectangular cross section funnel. At the section denoted 10—10, two heads 33, 34, apply solvent, through directed jets as illustrated in FIG. 10. The cross section of the funnel beyond the solvent application zone closes down as shown in FIG. 11. The applied solvent forms a meniscus when the advancing coated fibers are sufficiently close to one another to tangentially touch, as illustrated in FIG. 7.

Solvent drying may be aided by perforating the funnel 32 and by directing solvent-absorbing gas on that portion of the funnel, in a conventional manner (not shown). When the fibers exit funnel 32, drying is completed in the region denoted 35 either by exposure to the ambient air or by an additional directing of solvent-absorbing gas onto the advancing fiber ribbon. The fiber ribbon denoted 16a at this stage is permanently formed as a flat ribbon. Finally, the ribbon is dusted at station 35a with a powder such as calcium stearate, to decrease any residual tackiness. The fiber ribbon 16a is then stored on a reel 36 driven at a controlled rate by a motor 37, which determines the process line speed.

Figure 8:
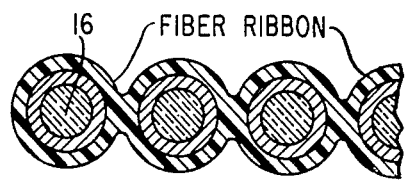

Advantageously, prior to receiving the solvent at station 31, the coated fibers are substantially totally dry. The solvent must be applied in quantities and concentrations that are carefully controlled. If the solvent is too active it will tend to strip away the coating altogether. A too-weak solvent on the other hand will not sufficiently dissolve the coating. Depending on the solvent used, a range of concentrations and temperatures exist that will result in the formation of a solvent weld as depicted in FIG. 8. The coating thickness remains the same around each fiber except at the region of tangency where the coats combine or solvent-weld together. The center-to-center spacing of the fiber cores which was established through the tangential contacting of the coated fibers as seen in FIG. 6, is maintained in the resulting completed fiber ribbon.

It may be advantageous in some instances for the fiber and coating to be done at a first stage, and then for the fiber ribbon to be produced separately particularly if the optimum speeds respectively of fiber drawing and ribbon manufacture are significantly different.

FIGS. 12, 13, and 14 illustrate one manner in which, pursuant to a further aspect of the invention, the optical fiber ribbon formed in the manner above, may be stripped back so as to expose the optical fibers preparatory to splicing. A solvent bath illustrated by the dish 40 of FIG. 12 containing solvent is one simple means. An optical fiber ribbon denoted 50 is dipped a predetermined distance and for a predetermind time into the solvent, as illustrated in FIG. 13. The resulting end stripping is shown in FIG. 14. The polymer coating is removed completely from the optical fibers in the region where the solvent contacted the coating. The undissolved and still intact portion of the coating maintains predetermined spatial relationship between the fibers of the ribbon 50. These fibers may then be spliced using the apparatus for example described in U.S. Pat. No. 3,864,018 of C. M. Miller issued Feb. 4, 1975.

The spirit of the invention is explained in the scope of the claims to follow.

What is claimed is:

1. An optical fiber waveguide comprising an optical fiber and a protective coating covering the fiber comprising an ethylene vinyl acetate copolymer in which the vinyl acetate content is in the range of 10% to 25% of the copolymer, the elastic modulus of the polymer coating is in the range of 2-5 kg/mm$^2$ and the melt index of the copolymer is in the range of 200-500.

2. The fiber waveguide of claim 1 in which the melt index is of the order of 3.

3. The fiber waveguide of claim 2 in which the vinyl acetate content of the copolymer is approximately 18% and the elastic modulus is approximately 4.5 kg/mm$^2$.

* * * * *

UNITED STATES PATENT AND TRADEMARK OFFICE
CERTIFICATE OF CORRECTION

PATENT NO. : 4,147,407
DATED : April 3, 1979
INVENTOR(S) : Bernard R. Eichenbaum and William B. Gardner It is certified that error appears in the above-identified patent and that said Letters Patent are hereby corrected as shown below:

Column 1, line 24, "439,029" should read --493,029--; line 35, "ribbor" should read --ribbon--. Column 2, line 10, "cars" should read --care--. Column 5, line 11, "creek" should read --creep--. Column 8, line 22, "zylene" should read --xylene--; lines 40-41, between "drawn" and "water" insert the following --fiber to guard against static fatigue failure by occupying--. Column 9, line 24, "Droolng" should read --Drooling--. Column 10, line 48, after "fiber" second occurrence, insert a comma.

Signed and Sealed this

Thirteenth Day of January 1981

[SEAL]

Attest:

SIDNEY A. DIAMOND

Attesting Officer

Commissioner of Patents and Trademarks